United States Patent

[11] 3,565,209

| [72] | Inventors | Wayne R. Babcock |
| | | Los Altos; |
| | | Alfredo G. Cattaneo, Los Altos Hills, Calif. |
| [21] | Appl. No. | 709,141 |
| [22] | Filed | Feb. 28, 1968 |
| | | Continuation-in-part of Ser. No. 675,487, Oct. 16, 1967. |
| [45] | Patented | Feb. 23, 1971 |
| [73] | Assignee | United Aircraft Corporation |
| | | East Hartford, Conn. |

[54] METHOD AND APPARATUS FOR GENERATING AN ACOUSTIC OUTPUT FROM AN IONIZED GAS STREAM
5 Claims, 4 Drawing Figs.

[52] U.S. Cl. ............................................. 181/35,
60/251, 60/253, 73/116, 313/230
[51] Int. Cl. ......................................... F01n 1/06
[50] Field of Search............................. 73/116;
313/230; 179/111, 113; 181/33(.03), 35, 33(.22), 33(.5)

[56] References Cited
UNITED STATES PATENTS
1,806,745  5/1931  DeForest.................... 179/113
3,146,849  9/1964  Tennyson.................. 181/33(.03)U OTHER REFERENCES
Loudspeaker Without Diaphragm. From Wireless World Vol. 58. Jan. 1952. pp. 2 and 3 TK 5700 W45

Primary Examiner—Jerry W. Myracle
Attorney—Steven F. Stone

ABSTRACT: An ionized gas stream is passed across spaced electrodes. A DC bias is maintained between the electrodes, and the intensity of the bias current is modulated in a predetermined manner. Acoustic waves corresponding in frequency to the frequency of the modulation of the bias current are generated by the gas stream. The invention is useful in a wide variety of applications ranging from entertainment to the testing and control of rocket motors and the suppression of noise produced by ionized gas streams such as those issuing from burners, furnaces and engines, for example.

PATENTED FEB 23 1971 3,565,209

WAYNE R. BABCOCK
ALFREDO G. CATTANEO
INVENTORS.

BY Steven F. Stone

ATTORNEY

WAYNE R. BABCOCK
ALFREDO G. CATTANEO
INVENTORS.

3,565,209

METHOD AND APPARATUS FOR GENERATING AN ACOUSTIC OUTPUT FROM AN IONIZED GAS STREAM

BACKGROUND OF THE INVENTION

In the development of high pressure reaction vessels and combustion chambers, it is necessary to determine if unstable conditions can be generated within the chamber. While the mechanisms of instability are not completely understood and may be attributed to many parameters, it is known that certain forms of instability occur as a result of resonant vibrations in the pressurized gas within the chamber. The present method of testing for instability can literally be described as the "shotgun" approach. According to this method, a blank shotgun shell is discharged into the combustion chamber of an operating rocket motor and variations in chamber pressure are measured. This method indicates whether the design is unstable, but does not yield any meaningful information as to the cause of the instability According to one application of this invention, means are provided for causing the pressurized gas to vibrate at known frequencies, whereby both the presence of instability and the resonant frequency of the instability can be determined.

In another aspect of this invention, the pressure within the combustion chamber can be made to vary in a predetermined manner. If pressure sensitive propellants are employed, the chamber pressure variations may be amplified and thrust variation of the same frequency may be obtained.

Another, less esoteric, but nevertheless important aspect of this invention resides in the use of this invention as a "flame loudspeaker." It has been discovered that audible signals of acceptable volume and fidelity can be generated by a flame without the use of any auxiliary loudspeakers by means of this invention.

In another aspect of this invention, it has been found that the method and apparatus of this invention can be used to suppress the noise produced by ionized gas streams by sensing the noise produced by such streams and feeding into such streams according to this invention acoustic waves out of phase therewith which cancel the naturally occurring noise by interference.

In addition to producing sound in air, it may also be possible to produce sound underwater for such purposes as underwater communication and sonar by modulating an underwater flame according to this invention.

It is accordingly an object of this invention to acoustically modulate an ionized gas stream.

It is another object of this invention to provide a means for determining combustion instability in a combustion chamber.

It is another object of this invention to produce predetermined pressure fluctuations in a combustion chamber.

It is another object of this invention to audibly reproduce electromagnetic signals without employing a conventional loudspeaker.

It is another object of this invention to suppress the noise produced by gas streams.

DESCRIPTION OF THE INVENTION

These and other objects of this invention will be readily apparent from the following description with reference to the accompanying drawings wherein.

Briefly stated, the invention contemplates flowing a direct current through an ionized gas stream and modulating the intensity of the current at the frequency or frequencies desired to be reproduced acoustically by the gas stream. Various means can be used to modulate the intensity of the direct current and include means for varying the resistance or voltage of the direct current circuit as well as means for imposing a varying current on the direct current. The latter approach is preferable and is employed in the embodiments hereinafter described, it being recognized that the invention is not limited thereto.

Figure 1:
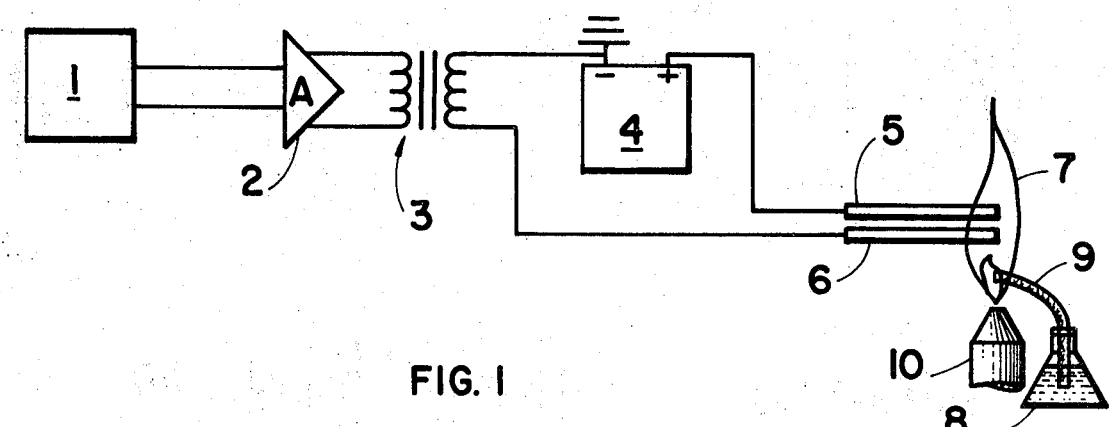
FIG. 1 is a schematic representation of an embodiment of this invention.

Referring now to FIG. 1, an embodiment of this invention comprises a source of the signal which is to be acoustically reproduced and an amplifier 2 connected thereto. Any suitable source may be employed and include without being limited to an oscillator, tape recorder, or radio receiver, for example, depending upon the signal it is desired to reproduce.

A source of DC current 4 is connected to a pair of heat resistant electrodes 5 and 6 which are maintained in spaced relationship in an ionized gas stream 7. In this embodiment the ionized gas stream is the flame of an oxyacetylene torch which is seeded with potassium ions from an aqueous $KNO_3$ solution 8 by means of wick 9. The DC circuit is coupled to the output of amplifier 2 by an inductive linkage 3 thereby modulating the current flowing in the DC circuit. In operation, the flame 7 acts as a loudspeaker and audible sound of good fidelity corresponding to the output of amplifier 2 has been produced by flame 7. Excellent reproduction of music and speech, for example, has been obtained.

In order to reduce distortion of the acoustic signal generated by ionized gas stream 7, certain general guidelines should be observed in selection of bias voltage and current both in the embodiment of FIG. 1 and in other embodiments of the invention. The DC bias voltage should be selected such that it is at least one-half of the peak-to-peak output voltage of the amplifier 2 and is preferably higher than this value. This prevents any change in the direction of current flow in the DC circuit. The DC voltage, however, must be kept below that which will create an arc discharge between electrodes 5 and 6. The current flow in the DC circuit is preferably maintained at at least .3 amperes. Below this value of current flow reduction in volume and distortion of the acoustic signal re quite noticeable. At and above this value there is relatively little distortion and large increases in current flow produce relative small charges in the level of distortion. The spacing of the electrodes in the ionized gas and the degree of ionization of the flame are selected such that the resistance in this portion of the circuit is compatible with the aforementioned voltage and current parameters. In the above-described embodiment, the system was operated satisfactorily at various electrode spacings and the flame was seeded to produce a resistance of from 2,000 to 3,000 Ω across the gap between electrodes 5 and 6. A 500 volt DC source was employed as the source of bias voltage 4.

Figure 2:
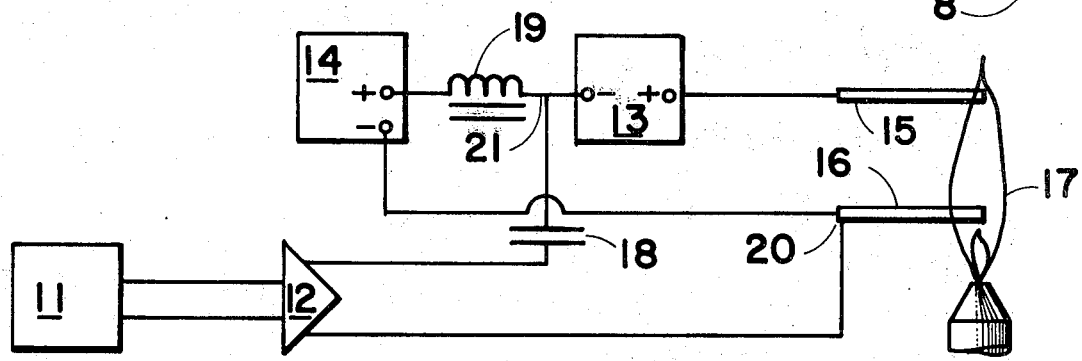
FIG. 2 is a schematic representation of another embodiment of this invention.

Referring now to FIG. 2, a more sophisticated embodiment of the invention is illustrated which employs a direct linkage between the AC signal and the DC bias circuit and has means for isolating the AC output, means for preventing negative current excursions and means for preventing the AC current from flowing through the DC bias source. The system comprises a signal source 11 coupled to amplifier 12 which is tapped into the DC circuit at points 20 and 21. Capacitance 18 is inserted into the AC circuit to isolate output amplifier 12 from the DC circuit. The DC bias circuit comprises, in series, a DC bias voltage source 14, a choke 19, an auxiliary source of DC voltage 13, and spaced electrodes 15 and 16 inserted in the ionized gas stream 17. The DC voltage of the bias voltage source is selected to be greater than the peak negative voltage of output amplifier 12 thereby preventing any change in direction of interruption of the current flowing between electrodes 15 and 16; the auxiliary DC source further ensures that the voltage level in the flame remains above a minimum level, below which distortion of the signal becomes significant. The choke 19 prevents the output current from amplifier 12 from flowing through bias voltage source 14. In operation with an output signal from amplifier 12 having a negative peak voltage of −100 volts, a 500 volt DC source 14, a 200 volt DC source 13, a 10-Henry choke 19 and a 40 microfarad, 1,000-v.

capacitor produced excellent acoustic reproduction of music and voice by ionized gas stream 17, which was seeded to produce about 2,500 Ω resistance between electrodes 15.

The frequency response of the flows of the systems of FIG. 1 is broader than the frequency range audible to the human ear and has been measured at frequencies as high as 100 kHz. It has been observed that low frequency acoustic waves can also be produced in the flame and that the coupling of the low frequency sound in the flame to the atmosphere can be improved by using large flames where the diameter approximates the wavelength of the lowest desired frequency. Thus, in addition to providing an omnidirectional loudspeaker, the system of this invention also provides a simple ultrasonic generator.

Figure 3:
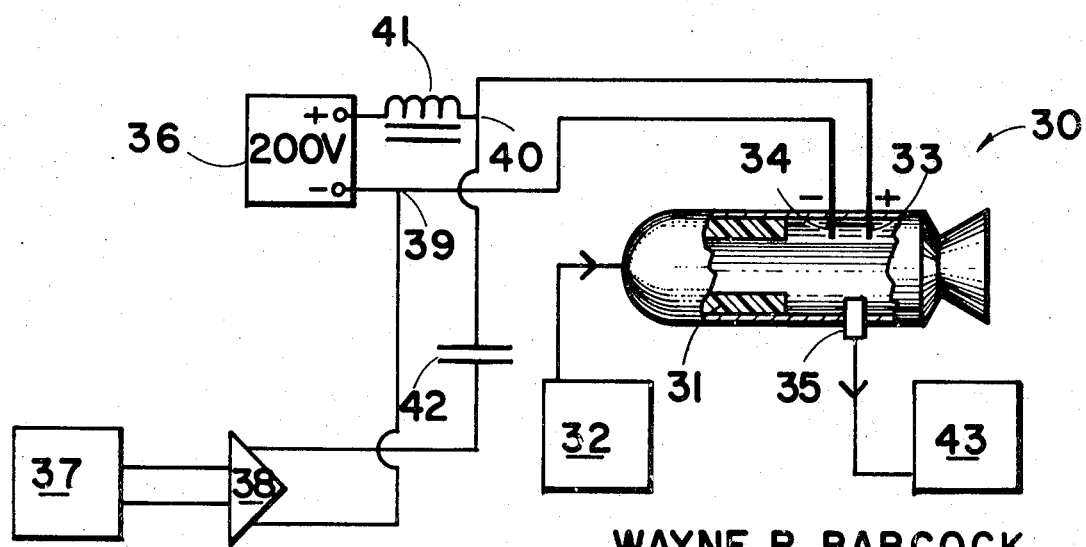
FIG. 3 is a schematic representation of a rocket motor employing an embodiment of this invention.

Referring now to FIG. 3, a system for generating acoustic waves in a combustion chamber is shown. This system will be illustrated with respect to a hybrid rocket motor, but it should be understood that the invention is useful with respect to other types of high pressure chambers. When the hot gas stream is generated by combustion of a solid material as in hybrid and solid propellant rocket motors, the solid material is seeded with a readily ionizable material such as a potassium salt if it does not itself contain adequate ionizable material. If the system employs only fluid components as in fluid mono and bipropellant rocket motors, the ionizable material may be dissolved or suspended in one of the fluid components or introduced separately into the combustion chamber. This embodiment comprises a conventional hybrid rocket motor 30 operating with a solid fuel grain 31 seeded with $KNO_3$ and a fluid oxidizer such as liquid oxygen from a suitably pressurized source 32. Spaced electrodes 33 and 34 extend in a sealed manner through the wall of motor 30 into the combustion or mixing chamber. A pressure transducer 35 is likewise provided within motor 30 and supplies signals to recorder 43. A DC bias voltage is maintained across spaced electrodes 33 and 34 by means of DC source 36 and the DC circuit is modulated with an audio signal from signal generator 37 and amplifier 38, which is tapped into DC circuit at points 39 and 40. Choke 41 and capacitance 42 perform the same functions as in the embodiment of FIG. 2.

In an operable embodiment of this invention, the fuel grain 31 would be seeded with sufficient readily ionizable material to produce ionized combustion gases having a resistance of from 150—300Ω between electrodes 34 and 35 after ignition of the motor. A convenient spacing of the electrode is from one to two inches. A signal of predetermined frequency is generated by signal generator 37 and in the absence of instability recorder 43 will produce a pressure trace from transducer 35 in which the frequency of the signal is superimposed on the motor pressure and its amplitude corresponds to the signal strength. If instability of the motor exists at the frequency of the imposed signal, resonance will occur and will be observed as a greatly increased amplitude. The increase in amplitude could, if desired, be used to automatically initiate shutoff of the oxidizer flow to prevent damage to the apparatus and permit later measurement of the grain geometry which led to instability. An alternative approach is to employ as a signal generator a variable oscillator capable of scanning a large range of frequencies. Such a system is particularly useful with liquid propellant rockets which do not encounter a change in internal geometry during firing, thereby permitting the investigation of a wide range of frequencies in one firing.

Another application of this invention is in modulating the thrust of a rocket motor employing a pressure sensitive propellant. In this embodiment, the acoustic waves generated within the rocket motor, corresponding to the input signal from source 37 will cause small pressure fluctuations which are multiplied by their effect on the burning rate of the propellant. The net result would be large thrust fluctuations corresponding in frequency to that of the input signal.

In addition to the above applications, the system of this invention may be utilized to suppress the noise in ionized gas streams such as the exhausts of rocket motors, furnace burners and the like. The noise produced by such gas streams can be considered as consisting of two components, i.e., a major component comprising the noise generated by oscillations in the gas stream itself and a minor component comprising the "shear noise" generated by the passage of the stream at high velocities through the atmosphere. This invention can be employed to substantially reduce the first component of such noise. This is accomplished by sensing the noise generated by the gas stream, generating an electrical signal out of phase with the noise sensed and imposing the signal on the gas stream as disclosed above. All prior art interference systems in which an interfering noise is used to suppress another noise require an interfering noise source physically separated from the source of noise to be suppressed and thus are capable of only producing localized suppression necessarily accompanied by an increase of noise in other areas. They system of this invention, however, actually cancels a major portion of the noise at its source and the suppression effect is general rather than localized.

Various means can be used to sense the noise generated by the gas stream and include without being limited to, microphones, photoelectric cells and means for detecting variations in conductivity of the gas stream. A preferred embodiment utilizes the photoelectric cell which measure the minute variations in the intensity of the radiation emitted by the gas stream which corresponds in frequency to the noise contained therein. It should be understood that such devices are not limited to the visible spectrum but can be used in both the infrared and ultraviolet ranges, and particularly the infrared, if the gas stream does not emit in the visible spectrum. Photoelectric means, particularly those sensing the visible spectrum, are preferred because such means do not pick up the shear noises, the sensing means can be located at a safe distance from the gas stream and commercially available devices possess adequate sensitivity.

Figure 4:
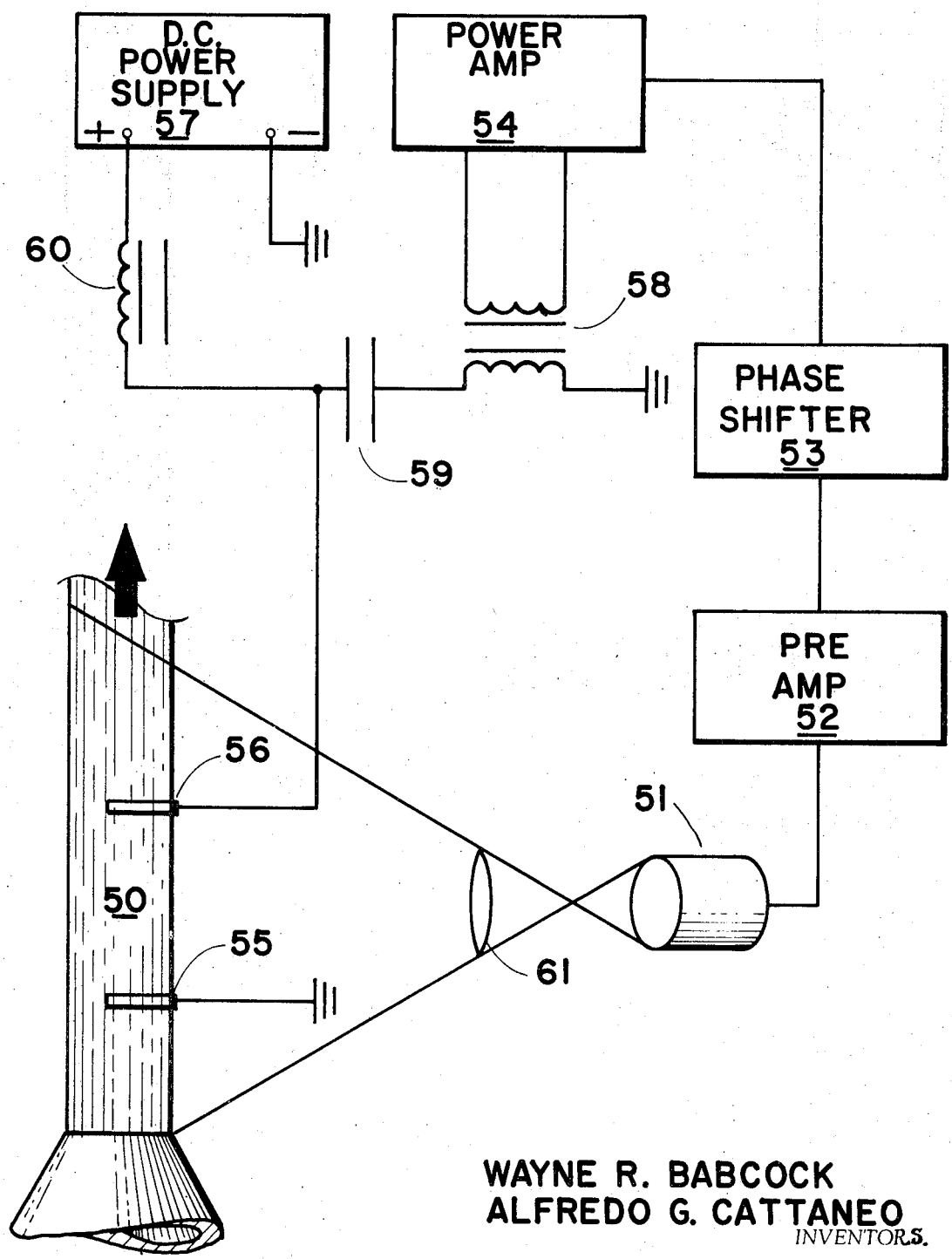
FIG. 4 is a schematic representation of a noise suppression system according to this invention.

Referring now to FIG. 4, a noise suppression system according to this invention is illustrated. The noise-generating gas stream 50 may comprise the exhaust of a furnace burner, rocket engine or the like or the flame of a torch, for example, and if the gas stream is not normally sufficiently ionized, it may be seeded with a readily ionizable material. The use of a sodium compound for seeding purposes is particularly useful since this not only ionizes the gas stream but also causes emission in the visible spectrum. Ionization of the gas stream may be readily accomplished as shown in FIG. 1 or by other means known to the art which include without being limited to adding an ionizable material to the reactants used to generate the gas stream, feeding a consumable glass rod containing ionizable material into the stream or aspirating an ionizable liquid into the stream, for example. Sensing means 51, illustrated as a photoelectric cell and a lens 61 to focus the light emitted from the gas stream, detects the frequency of the noise present in the gas stream and generates a signal which is fed into preamplifier 52, phase shifter 53 and power amplifier 54. Electrodes 55 and 56 are located in the ionized gas stream 50 and a DC bias current is caused to flow between the electrodes from DC source 57. The DC current is modulated by the output from power amplifier 54 through the inductive linkage 58. Capacitor 59 and choke 60 can be employed for the reasons described above.

It is desirable that the phase shifter 53 be variable to permit adjustment of the system. Suitable phase shifters are known to the art and a suitable circuit is described in L. Morton, "Methods of Experimental Physics," Vol. 2, p 551, FIG. 1, Academic Press (1964).

In operation the signal generated by detecting means 51 is shifted in phase and imposed on the DC bias current flowing between electrodes 55 and 56. The phase shift is generally approximately 180°, however, the phase shifter is adjustable to compensate for time delays which may occur in the detecting system due to the type of detecting apparatus and the distance of the detecting means from the source 50. Adjustment of phase shifter 53 is made until a minimum noise output from gas stream 50 is observed.

In operation it has been observed that the system of this invention actually reduces the noise issuing from the gas stream 50. The effect thus produced does not exhibit the localized suppressing effect obtained by previous interference noise suppression systems but produces a general omnidirectional suppression.

While this invention has been described with respect to several embodiments of this invention, it should not be construed as limited thereto. Various modifications will suggest themselves to workers skilled in the art and can be made without departing from the scope of this invention, which is limited only by the following claims wherein:

We claim:

1. A method for suppressing the noise generated in an ionized gas stream which comprises:
   a. sensing the frequency of the noise generated in said gas stream;
   b. flowing a direct current through said gas stream; and
   c. varying the intensity of said current at a frequency corresponding to that sensed and out of phase therewith.

2. Apparatus for suppressing noise generated in an ionized gas stream which comprises:
   a. means for flowing a direct current through said gas stream;
   b. means for sensing the frequency of the noise generated in said gas stream; and
   c. means for varying the intensity of said direct current at a frequency corresponding to that sensed and out of phase therewith.

3. A method for suppressing noise generated in an ionized gas stream which comprises:
   a. sensing the frequency of noise generated in said gas stream;
   b. producing an electrical signal corresponding in frequency to the frequency of the noise sensed and out of phase therewith;
   c. flowing a direct current through said ionized gas stream; and
   d. modulating said direct current with said electrical signal.

4. Apparatus for suppressing the noise produced by an ionized gas stream comprising:
   a. sensing means for sensing the frequency of noise produced by said gas stream;
   b. signal generating means for generating an electrical signal corresponding in frequency to said noise and out phase therewith;
   c. direct current means for flowing a direct current through said ionized gas stream; and
   d. means for modulating said direct current with said signal.

5. The apparatus of claim 4 wherein said sensing means comprises a photoelectric cell.